United States Patent
Yamada et al.

(10) Patent No.: US 11,313,412 B2
(45) Date of Patent: Apr. 26, 2022

(54) SLIDE BEARING

(71) Applicant: OILES CORPORATION, Tokyo (JP)

(72) Inventors: Tomohiro Yamada, Fujisawa (JP);
Yoshiteru Igarashi, Fujisawa (JP);
Kouichi Morishige, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 107 days.

(21) Appl. No.: 16/644,718

(22) PCT Filed: Aug. 30, 2018

(86) PCT No.: PCT/JP2018/032264
§ 371 (c)(1),
(2) Date: Mar. 5, 2020

(87) PCT Pub. No.: WO2019/054197
PCT Pub. Date: Mar. 21, 2019

(65) Prior Publication Data
US 2020/0284294 A1 Sep. 10, 2020

(30) Foreign Application Priority Data

Sep. 14, 2017 (JP) .............................. JP2017-177079

(51) Int. Cl.
*F16C 17/04* (2006.01)
*F16C 33/74* (2006.01)
*F16J 15/3232* (2016.01)

(52) U.S. Cl.
CPC .............. *F16C 17/04* (2013.01); *F16C 33/74* (2013.01); *F16J 15/3232* (2013.01)

(58) Field of Classification Search
CPC .... F16J 15/00; F16J 15/16; F16J 15/50; F16J 15/52; F16J 15/3232; F16J 15/3236;
(Continued)

(56) References Cited

U.S. PATENT DOCUMENTS 7,837,016 B2 * 11/2010 Chamousset ........... F16C 33/80
188/321.11
8,708,568 B2 * 4/2014 Morishige ............... F16C 17/04
384/420
(Continued)

FOREIGN PATENT DOCUMENTS

CN 102648356 A1 8/2012
CN 103547822 A 1/2014
(Continued)

OTHER PUBLICATIONS

International Search Report for PCT/JP2018/032264, dated Dec. 4, 2018, 4 pages.
(Continued)

*Primary Examiner* — Nathan Cumar
(74) *Attorney, Agent, or Firm* — Nixon & Vanderhye P.C.

(57) ABSTRACT

Provided is a slide bearing capable of retaining strength while achieving weight reduction and cost-cutting.
The slide bearing has an upper case (2) to be attached to an upper support for attaching a suspension to a vehicle body, a lower case (3) rotatably combined with the upper case (2), an annular center plate (4) located between the upper case (2) and the lower case (3), and an annular sliding sheet (5) located between the upper case (2) and the center plate (4). The lower case (3) has a lower case body (31) in a substantial cylindrical shape, a flange part (32) projecting radially outward from an outer peripheral surface of the lower case body (31), and hollow sections (321) formed on an outer peripheral surface of the flange part (32). A plurality of the hollow sections (321) are formed at equal intervals in a circumferential direction on the outer peripheral surface of the flange part (32).

11 Claims, 11 Drawing Sheets

(58) Field of Classification Search
CPC .......... F16C 17/00; F16C 17/04; F16C 33/00; F16C 33/72; F16C 33/74; F16C 33/741; F16C 33/743
USPC ........................................................ 277/549
See application file for complete search history.

(56) References Cited

U.S. PATENT DOCUMENTS

| | | | |
|---|---|---|---|
| 9,004,769 B2 * | 4/2015 | Morishige | F16C 33/20 384/420 |
| 2003/0002764 A1 | 1/2003 | Pflugner et al. | |
| 2006/0215945 A1 | 9/2006 | Miyata et al. | |
| 2007/0267793 A1 | 11/2007 | Chamousset et al. | |
| 2012/0251024 A1 * | 10/2012 | Brisson | F16C 33/588 384/513 |
| 2013/0322798 A1 | 12/2013 | Morishige et al. | |
| 2014/0199007 A1 | 7/2014 | Morishige et al. | |
| 2018/0370317 A1 | 12/2018 | Takahashi et al. | |

FOREIGN PATENT DOCUMENTS

| | | |
|---|---|---|
| DE | 10 2007 022 622 | 11/2007 |
| EP | 1 607 645 | 12/2005 |
| EP | 2 719 910 | 4/2014 |
| EP | 3 401 561 | 11/2018 |
| JP | 2-93571 | 7/1990 |
| JP | 2004-293589 | 10/2004 |
| JP | 2009-270720 | 11/2009 |
| JP | 2012-172814 | 9/2012 |
| JP | 2013-096534 | 5/2013 |
| JP | 2015-086993 | 5/2015 |
| JP | 2016-128722 | 7/2016 |
| JP | 2017-122499 | 7/2017 |
| JP | 2017-125598 | 7/2017 |

OTHER PUBLICATIONS

Written Opinion of the ISA for PCT/JP2018/032264, dated Dec. 4, 2018, 6 pages.
Search Report issued in EP Appln. No. 18855780.5 dated May 11, 2021.
Search Report dated May 6, 2021 issued in Chinese Application No. 201880058547.3 with English translation (5 pages).

* cited by examiner

Fig. 5
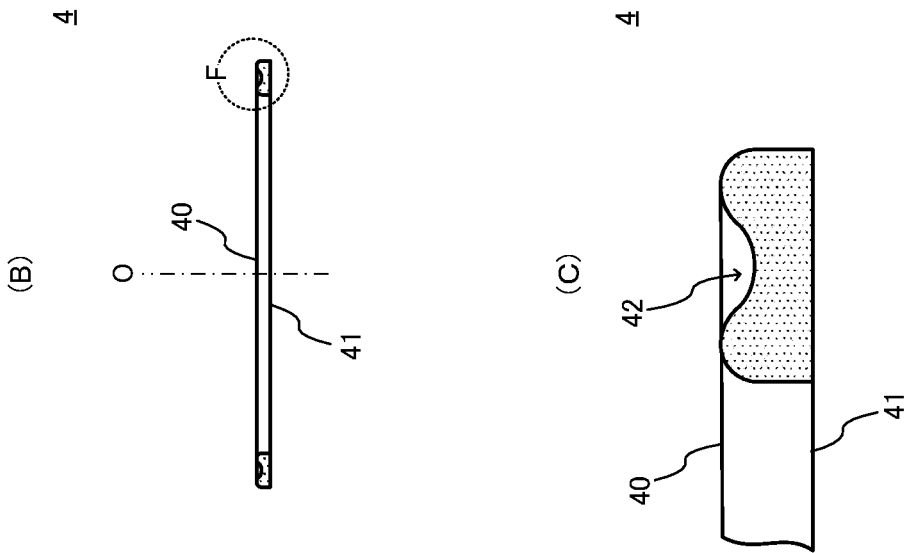
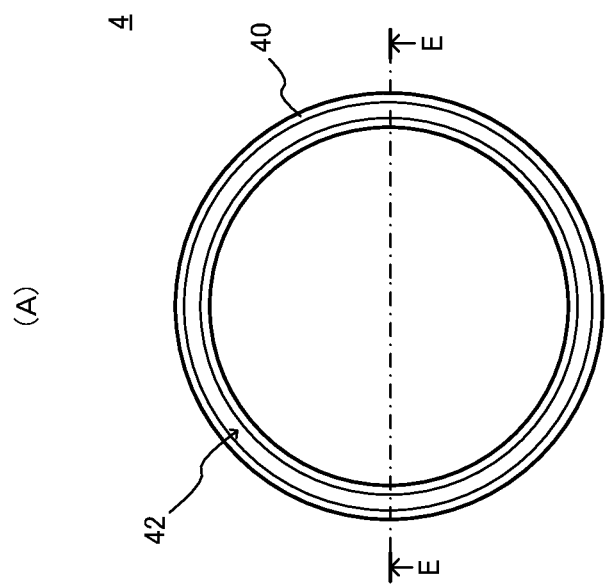

SLIDE BEARING

This application is the U.S. national phase of International Application No. PCT/JP2018/032264 filed 30 Aug. 2018, which designated the U.S. and claims priority to JP Patent Application No. 2017-177079 filed 14 Sep. 2017, the entire contents of each of which are hereby incorporated by reference.

TECHNICAL FIELD

The present invention relates to a slide bearing for supporting a load, and in particular relates to a slide bearing for supporting a load on a shaft member, such as a suspension for a vehicle.

BACKGROUND ART

A strut type suspension to be used for a front wheel of an automobile has a structure in which a piston rod, a shock absorber, and a coil spring are combined together, and the shock absorber rotates together with the coil spring in response to a steering operation. Accordingly, in order to support a load on the strut type suspension while allowing smooth rotation of the shock absorber and the coil spring, a bearing is usually installed between an upper mount that is provided as a mounting mechanics for mounting the strut type suspension onto a vehicle body and an upper spring seat that is provided as a spring seat for supporting an upper end of the coil spring.

For example, the Patent Literature 1 discloses a slide bearing for a strut type suspension, which is made of synthetic resin. This slide bearing has an upper case to be attached to the upper mount, a lower case combined with the upper case so as to be attached to the upper spring seat, an annular center plate located between the upper case and the lower case and including a bearing surface for supporting a load on the strut type suspension, and an annular sliding sheet located between the upper case and the center plate and including a sliding surface slidable over the bearing surface of the center plate. The upper case and the lower case are combined together so as to be rotatable relative to each other because of the sliding sheet and the center plate. This causes this slide bearing to support a load on the strut type suspension while allowing smooth rotational motions of the shock absorber and the coil spring.

CITATION LIST

Patent Literature

Patent Literature 1: Japanese Unexamined Patent Application Laid-Open No. 2012-172814

SUMMARY OF INVENTION

Technical Problem

For the slide bearing disclosed in Patent Literature 1, the lower case has a lower case body in a substantial cylindrical shape having an insertion hole for insertion of the shock absorber and a flange part formed on an upper end part of the lower case body so as to project radially outwardly from an outer peripheral surface of the lower case body, the center plate is placed on an upper surface of the flange part, and the upper spring seat is attached to a lower surface of the flange part.

The upper surface of the flange part is provided, as hollow sections for the purpose of weight reduction, cost-cutting, or the like, with a plurality of recess sections each in a substantial cylindrical shape or in a substantial triangular prism, which are located at equal intervals in a circumferential direction. Here, it is conceivable that the lower surface of the flange part may be also provided with hollow sections as with the upper surface of the flange part, for the purpose of further weight reduction of the lower case, cost-cutting, or the like. Providing the lower surface of the flange part with the hollow sections, however, may create situation as follows.

Specifically, sometimes the lower surface of the flange part of the lower case be designed to work as alternative to the upper spring seat and thereby the upper spring seat is omitted. In such cases, an upper end part of the coil spring is made to abut the lower surface of the flange part directly or through a rubber sheet. At this time, on the occurrence of putting of the upper end part of the coil spring in any of the hollow sections provided on the lower surface of the flange part, a reaction force of the coil spring may be concentrated in this hollow section to damage the lower case or the rubber sheet.

The present invention has been made in view of the above situation, and an object of the invention is to provide a slide bearing capable of retaining strength while achieving weight reduction and cost-cutting.

Solution to Problem

In response to the above issue, for a slide bearing of the present invention, a lower case, which includes a lower case body in a substantial cylindrical shape and a flange part projecting radially outwardly from an outer peripheral surface of the lower case body, is provided with a recess section on an outer peripheral surface of the flange part as a hollow section.

For example, the present invention provides a slide bearing for supporting a load, the slide bearing has the following:
an upper case, and
a lower case rotatably combined with the upper case.
The lower case includes the following:
a lower case body in a substantial cylindrical shape;
a flange part projecting radially outwardly from an outer peripheral surface of the lower case body; and
a recess section formed an outer peripheral surface of the flange part.

Advantageous Effects of Invention

According to the present invention, the recess section is provided on the outer peripheral surface of the flange part of the lower case, therefore reducing the usage of materials to achieve weight reduction of the lower case, cost cutting, or the like, and further allowing a recess section to be omitted from a lower surface of the flange part to flatten the lower surface of the flange part. This causes the reaction force transmitted from the coil spring to the lower case directly or through the rubber sheet to be distributed over the lower surface of the flange part even when the lower surface of the flange part of the lower case is designed to work as alternative to an upper spring seat without use of the upper spring seat. This leads to no possibility of damage to the lower case or the rubber sheet, resulting in retention of strength, and at the same time achieves weight reduction and cost cutting.

BRIEF DESCRIPTION OF DRAWINGS

FIG. 5(A) is a plan view of a center plate 4, FIG. 5(B) is an E-E cross sectional view of the center plate 4 as illustrated in FIG. 5(A), and FIG. 5(C) is an enlarged view of the part F of the center plate 4 as illustrated in FIG. 5(B).

DESCRIPTION OF EMBODIMENTS

In the following, one embodiment of the present invention will be described.

Figure 1:
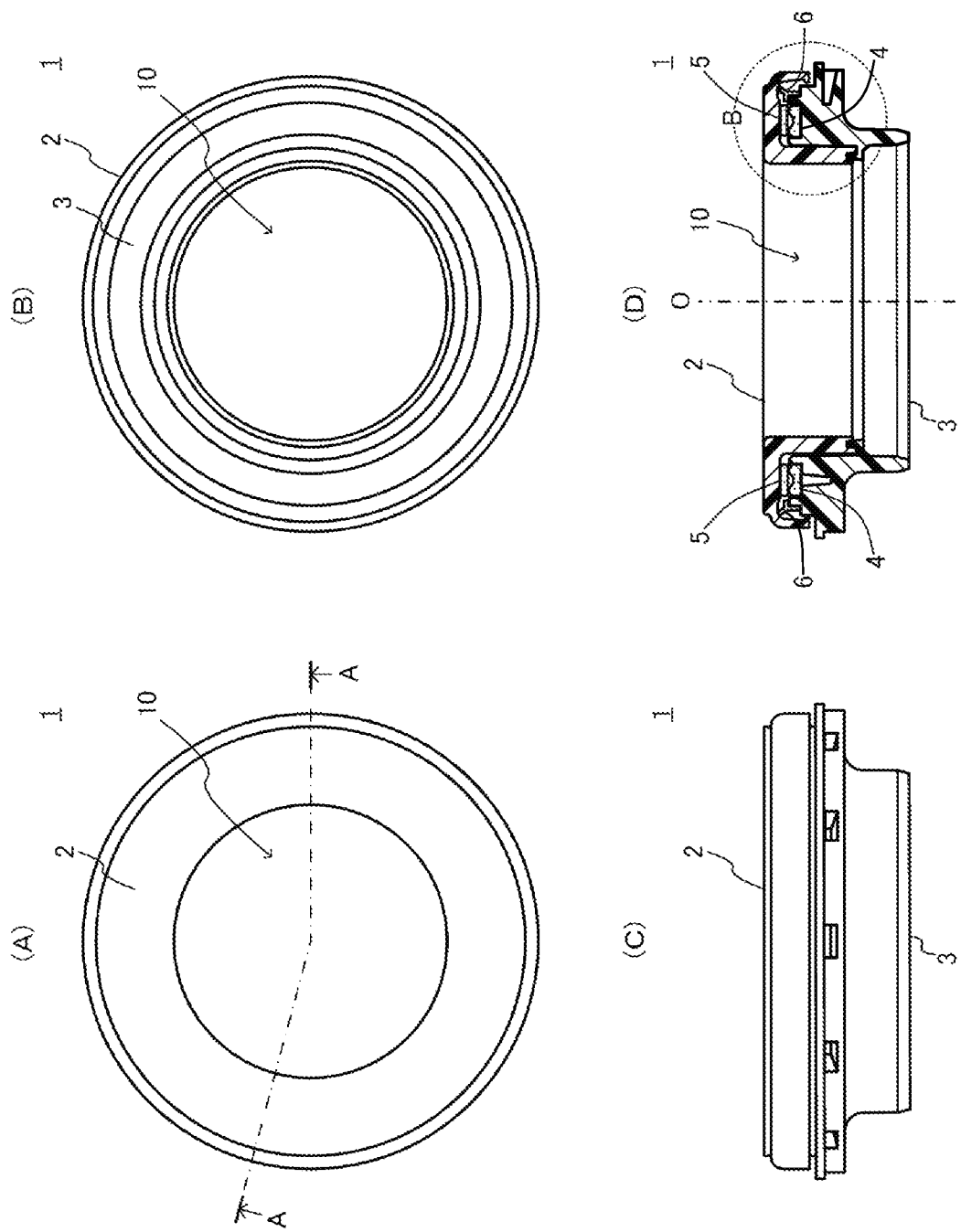
FIG. 1(A), FIG. 1(B) and FIG. 1(C) are respectively a plan view, a bottom view, and a front view, of a slide bearing 1 according to one embodiment of the present invention.
FIG. 1(D) is an A-A cross sectional view of the slide bearing 1 as illustrated in FIG. 1(A).
Figure 2:
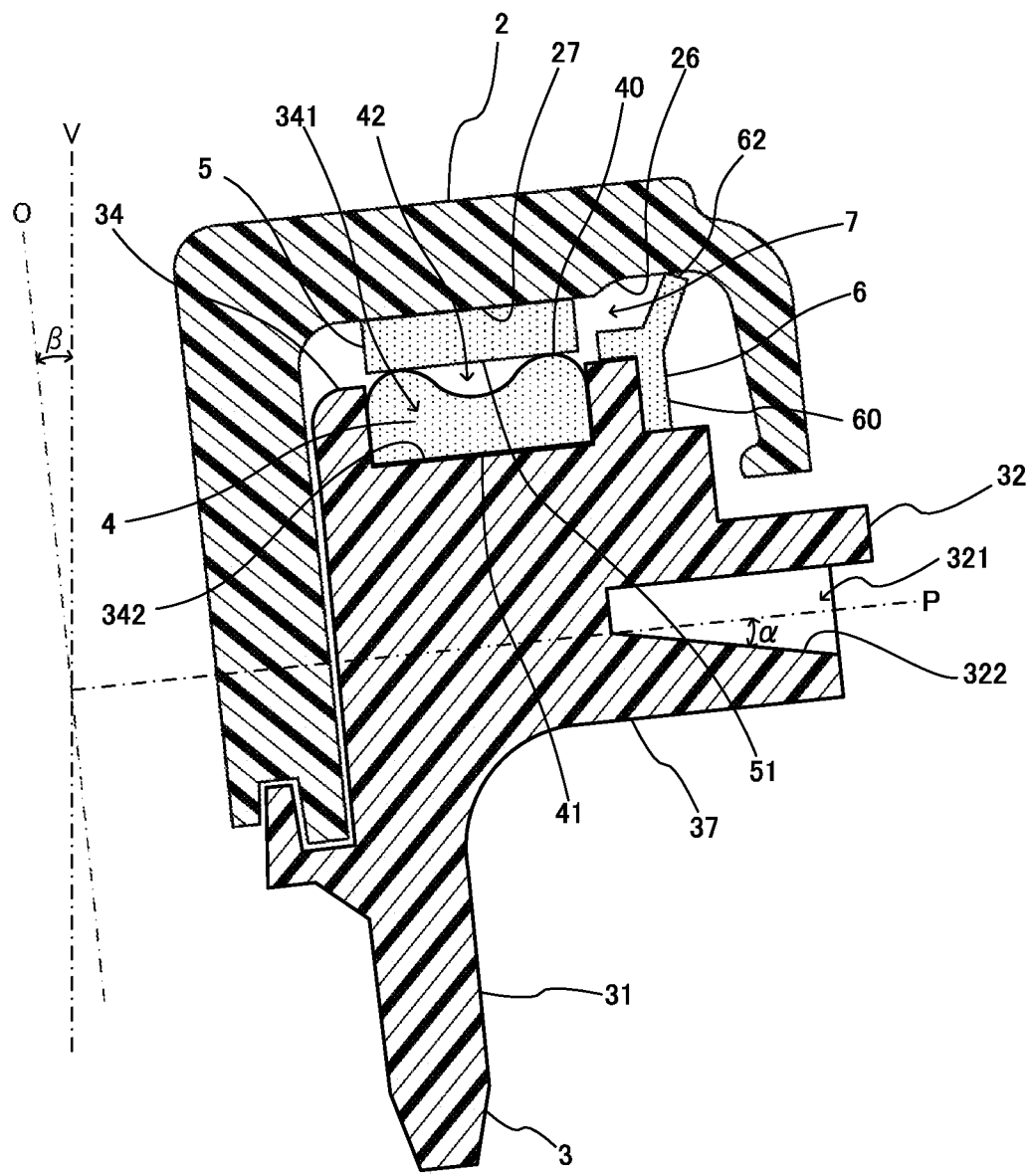
FIG. 2 is an enlarged view of the part B of the slide bearing 1 as illustrated in FIG. 1(D).

FIG. 1(A), FIG. 1(B) and FIG. 1(C) are respectively a plan view, a bottom view, and a front view, of a slide bearing 1 according to one embodiment of the present invention, and FIG. 1(D) is an A-A cross sectional view of the slide bearing 1 as illustrated in FIG. 1(A). FIG. 2 is an enlarged view of the part B of the slide bearing 1 as illustrated in FIG. 1(D).

The slide bearing 1 according to the present embodiment, includes a holding hole 10 for holding a shock absorber (not illustrated in the figures) of a suspension (e.g. a strut type suspension) on a vehicle within, thus being to support a load of a vehicle body to be applied on the suspension while allowing rotational motion of the shock absorber held in this holding hole 10.

As illustrated in the figures, the slide bearing 1 has an upper case 2, a lower case 3 rotatably combined with the upper case 2 to create an annular space 7 between the lower case 3 and the upper case 2, a center plate 4 in a substantial annular shape and a sliding sheet 5 in a substantial annular shape each placed within this annular space 7, a dust seal 6 for preventing intrusion of dust into this annular space 7, and a lubricant, such as lubricating grease, held by the center plate 4 although not illustrated.

The upper case 2 is made of thermoplastic resin excellent in sliding properties, such as polyacetal resin impregnated with lubricating oil as necessary, and is, with the shock absorber of the suspension inserted therein, attachable to an upper mount (not illustrated in the figures) that is provided as a mounting mechanism for mounting the suspension onto the vehicle body.

Figure 3:
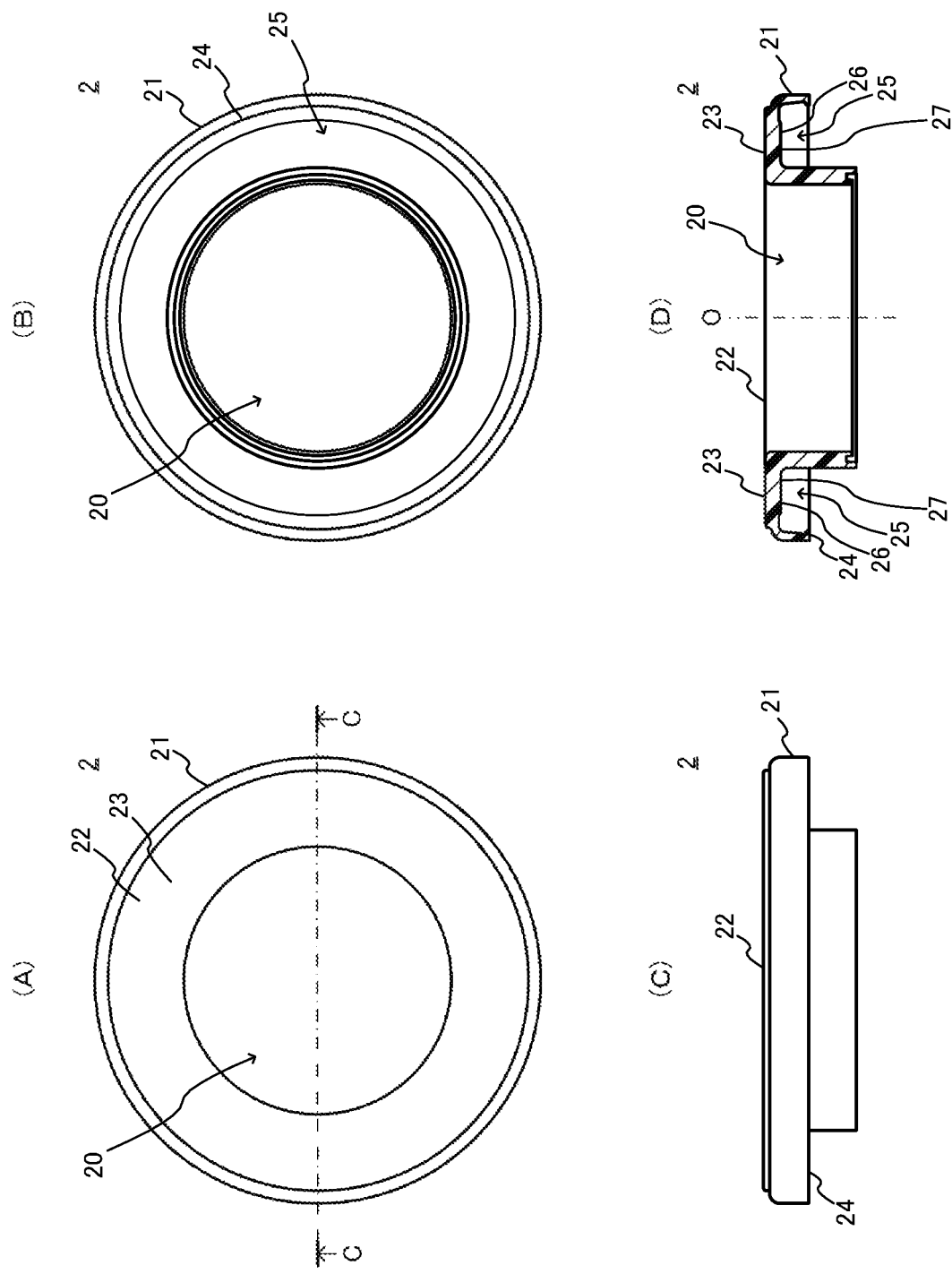
FIG. 3(A), FIG. 3(B), and FIG. 3(C) are respectively a plan view, a bottom view, and a front view, of an upper case 2.
FIG. 3(D) is a C-C cross sectional view of the upper case 2 as illustrated in FIG. 3(A).

FIG. 3(A), FIG. 3(B), and FIG. 3(C) are respectively a plan view, a bottom view, and a front view, of the upper case 2, and FIG. 3(D) is a C-C cross sectional view of the upper case 2 as illustrated in FIG. 3(A).

As illustrated in the figures, the upper case 2 has the following: an upper case body 21 in a substantial annular shape, including an insertion hole 20 for insertion of the shock absorber; an attachment surface 23 which is formed in an upper surface 22 of the upper case body 21 and is intended for attachment of the slide bearing 1 to the upper mount; and an annular recess section 25 which is formed in a lower surface 24 of the upper case body 21 so as to be rotatably combined with the lower case 3 to create the annular space 7.

A bottom 26 inside the annular recess section 25 is provided with a load transmission surface 27 which forms an upper interior surface of the annular space 7. The load transmission surface 27 is to transmit a load of the vehicle body applied onto the suspension to the sliding sheet 5 and the center plate 4.

The lower case 3 is made of thermoplastic resin, such as polyamide resin and is, with the shock absorber of the suspension inserted therein, rotatably combined with the upper case 2.

Figure 4:
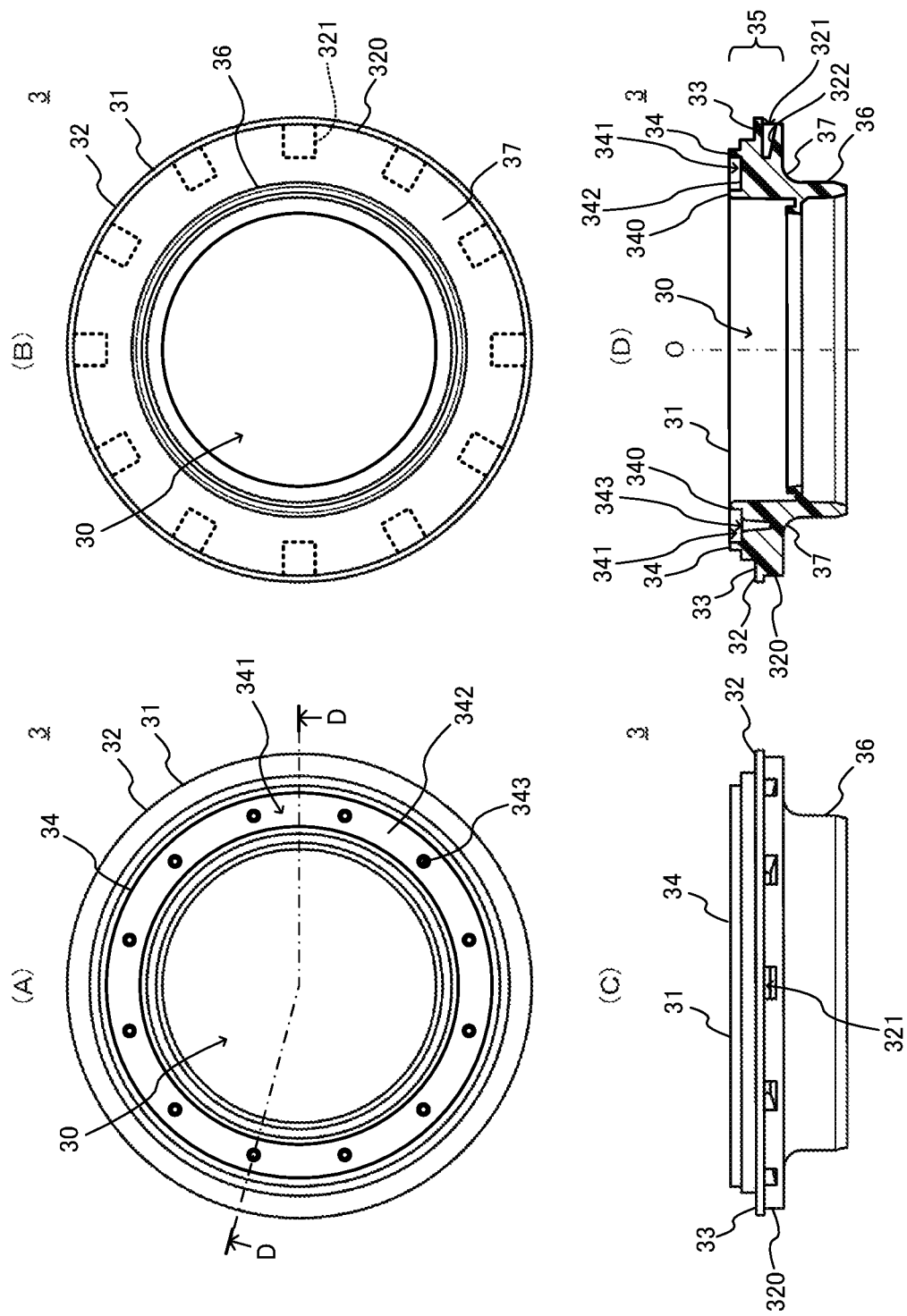
FIG. 4(A), FIG. 4(B), and FIG. 4(C) are respectively a plan view, a bottom view, and a front view, of a lower case 3.
FIG. 4(D) is a D-D cross sectional view of the lower case 3 as illustrated in FIG. 4(A).

FIG. 4(A), FIG. 4(B), and FIG. 4(C) are respectively a plan view, a bottom view, and a front view, of the lower case 3, and FIG. 4(D) is a D-D cross sectional view of the lower case 3 as illustrated in FIG. 4(A).

As illustrated in the figures, the lower case 3 has the following: a lower case body 31 in a substantial cylindrical shape, including an insertion hole 30 for insertion of the shock absorber; a flange part 32 which is formed on an upper end part 35 side of the lower case body 31 so as to project radially outwardly from an outer peripheral surface 36 of the lower case body 31; and an annular protrusion 34 which is formed on an upper surface 33 of the flange part 32 and which is, upon rotatable combination of the lower case 3 with the upper case 2, held within the annular recess section 25 formed in a lower surface 24 of the upper case body 21 of the upper case 2 and thereby creates the annular space 7.

An upper surface 340 of the annular protrusion 34 is provided with an annular recess section 341 for holding the center plate 4 within, and a bottom 342 inside the annular recess section 341 is provided with a plurality of hollow sections 343 arranged at equal intervals in a circumferential direction, each of which is a recess section in the form of a substantial cylinder formed along an axis O. It is to be noted in FIG. 4 that only some of the hollow sections 343 are designated by reference characters.

An outer peripheral surface 320 of the flange part is provided with a plurality of hollow sections 321 arranged at equal intervals in the circumferential direction, each of which is a recess section in the form of a substantial quadrangular prism formed in a radial direction. Here, the hollow sections 321 preferably are arranged alternating with the hollow sections 343 formed on the bottom 342 of the annular recess section 341 in the circumferential direction. Such an arrangement allows each thin-walled section within the lower case 3 to be thicker than if each of the hollow sections 321 and the corresponding hollow section 343 are located at respective places which overlap in the circumferential direction, and moreover allows the thin-walled sections to be evenly distributed within the lower case 3, thereby causing the lower case 3 to increase in strength. It is to be noted in FIG. 4 that only some of the hollow sections 321 are designated by reference characters.

Inside each hollow section 321, a corresponding wall surface 322 located on the lower side in the direction of the axis O, slopes in an upward direction of the axis O as it goes radially inwardly (See FIG. 2). This causes fluid entering the hollow sections 321, such as muddy water, to be discharged to the outside. Here, a slope (or angle) α of the wall surface 322 with respect to a perpendicular P to the axis O is preferably larger than a slope (or angle) β of the axis O with respect to a vertical line V when the slide bearing 1 is attached to the vehicle body. This way ensures more reliable discharge of fluid entering the hollow sections 321, such as muddy water, to the outside.

A lower surface 37 of the flange part 32 works as an upper spring seat that is a spring seat for supporting an upper end part of a coil spring (not illustrated in the figures) forming the suspension of the vehicle along with the shock absorber.

The center plate 4 is made of elastic material excellent in sliding properties. Example of such the elastic material may include, but not limited to, polyolefin based thermoplastic elastomer, polyester based thermoplastic elastomer, polyurethane based thermoplastic elastomer, and polyamide based thermoplastic elastomer, to each of which lubricant, such as PTFE (polytetrafluoroethylene), lubricating oil, and silicone, is added as necessary. The center plate 4 is placed within the annular recess section 341 formed on the upper surface 340 of the annular protrusion 34 of the lower case 3 so as to support the load of the vehicle body to be applied to the suspension through the load transmission surface 27 of the annular recess section 25 of the upper case 2 forming the annular space 7 along with the annular protrusion 34, and the sliding sheet 5 (See FIG. 2).

FIG. 5(A) is a plan view of the center plate 4, FIG. 5(B) is an E-E cross sectional view of the center plate 4 as illustrated in FIG. 5(A), and FIG. 5(C) is an enlarged view of the part F of the center plate 4 as illustrated in FIG. 5(B).

As illustrated in the figures, the center plate 4, which is an annular object, includes a bearing surface 40 for supporting the load applied through the load transmission surface 27 formed on the bottom 26 inside the annular recess section 25 of the upper case 2 and the sliding sheet 5, a back face 41 located opposite the bearing surface 40 and facing and contacting with the bottom 342 inside the annular recess section 341, and an annular groove 42 formed in the bearing surface so as to hold a lubricant, such as lubricating grease.

The sliding sheet 5 is made of thermoplastic plastic excellent in sliding properties, including a fluorine resin, such as PTFE and Modified PTFE obtained by copolymerization of TFE (tetrafluoroethylene) and a trace of other material (comonomers), polyacetal resin, polyethylene resin, polyamide resin, and polyphenylene sulfide resin; lubricant, including PTFE (with a proviso that the case of using PTFE or Modified PTFE as thermoplastic plastic material is excluded), lubricating oil, silicone, and graphite, and/or reinforcement material, including aramid fibers, glass fibers, and carbon fibers, are added thereto as necessary. Alternatively, the sliding sheet 5 may be made of metal material excellent in sliding properties, such as Brass alloy. The sliding sheet 5 is placed within the annular space 7 and between the bearing surface 40 of the center plate 4 and the load transmission surface 27 of the upper case 2.

Figure 6:
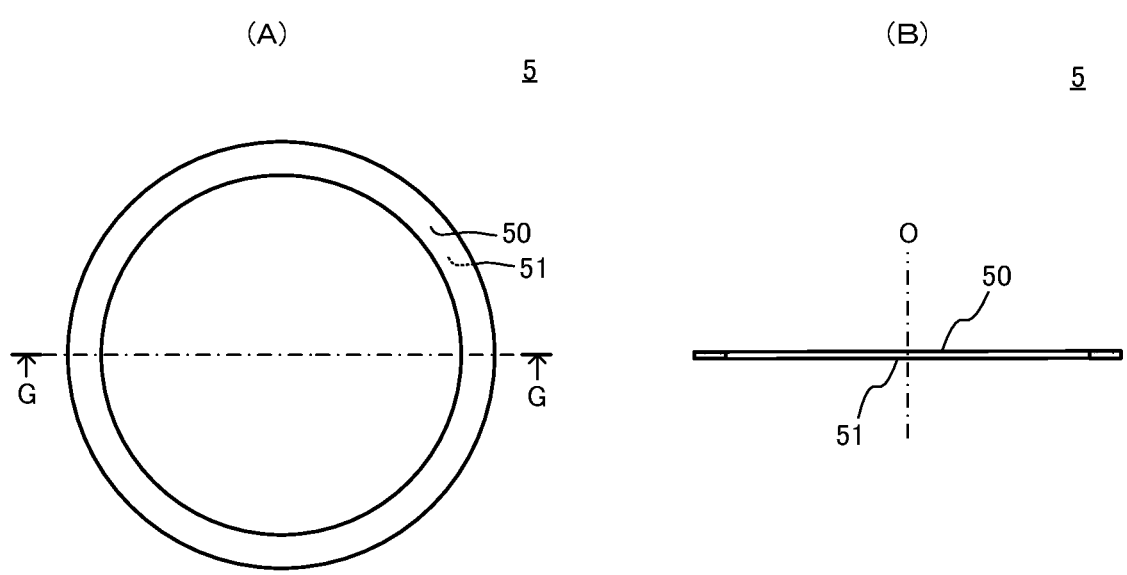
FIG. 6(A) is a plan view of a sliding sheet 5.
FIG. 6(B) is a G-G cross sectional view of the sliding sheet 5 as illustrated in FIG. 6(A).

FIG. 6(A) is a plan view of the sliding sheet 5, and FIG. 6(B) is a G-G cross sectional view of the sliding sheet 5 as illustrated in FIG. 6(A).

As illustrated in the figures, the sliding sheet 5, which is an annular object whose cross section in the direction of the axis O is formed into a substantial flat plate shape, includes a contact surface 50 to have a contact with the load transmission surface 27 formed on the bottom 26 inside the annular recess section 25 of the upper case 2, and a sliding surface 51 located opposite the contact surface 50 so as to slide against the bearing surface 40 of the center plate 4. Slidable contact of the sliding surface 51 of the sliding sheet 5 with the bearing surface 40 of the center plate 4 allows relative rotational motion between the upper case 2 and the lower case 3.

The dust seal 6, which is made of elastic material, such as urethane resin, is attached to the annular protrusion 34 of the lower case 3, thereby sealing a space that is formed between the upper case 2 and the lower case 3 and leads to the annular space 7, as illustrated in FIG. 2.

Figure 7:
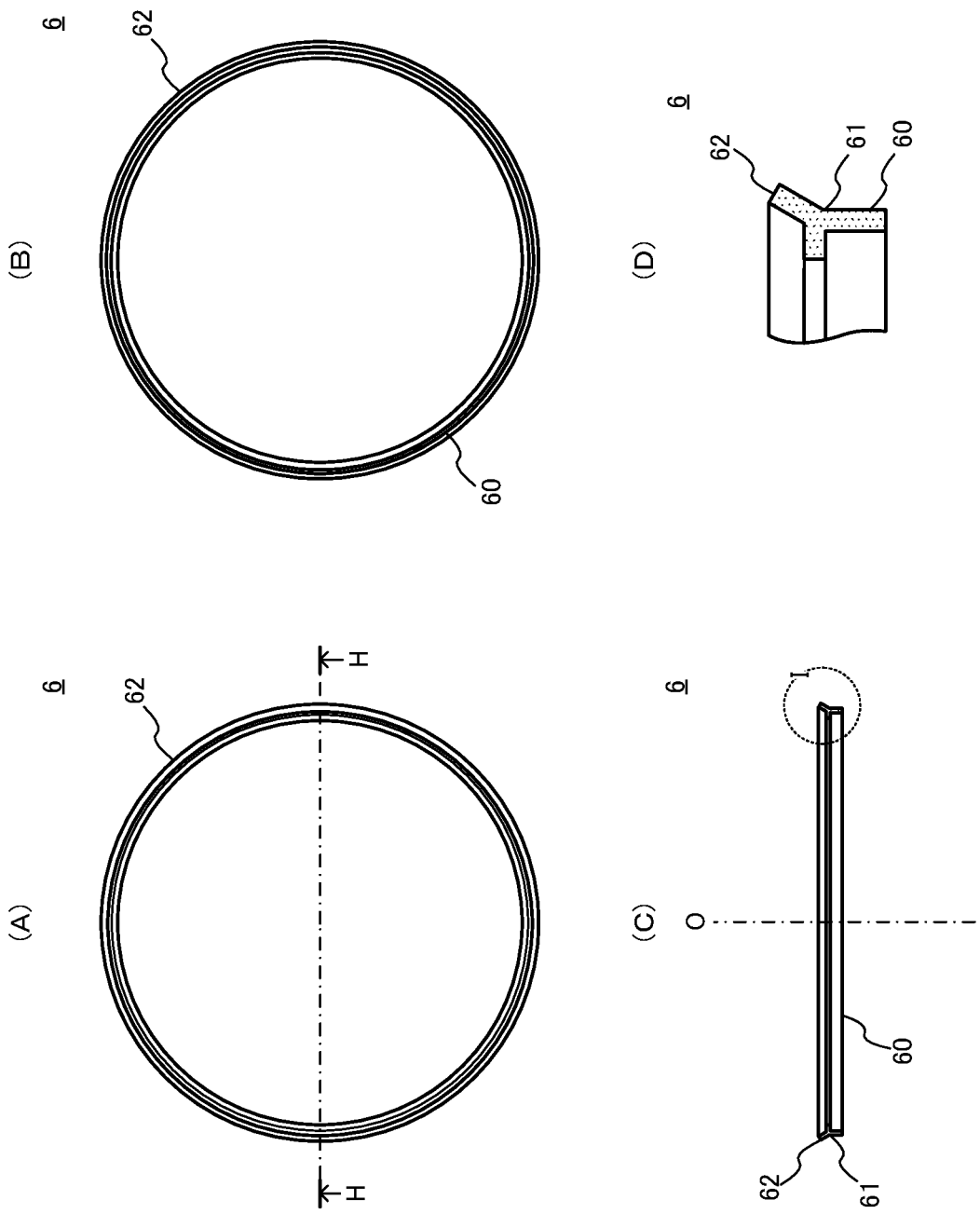
FIG. 7(A) and FIG. 7(B) are respectively a plan view and a bottom view of a dust seal 6.
FIG. 7(C) is an H-H cross-sectional view of the dust seal 6 as illustrated in FIG. 7(A)
FIG. 7(D) is an enlarged view of the part I of the dust seal 6 as illustrated in FIG. 7(C).

FIG. 7(A) and FIG. 7(B) are respectively a plan view and a bottom view of the dust seal 6, FIG. 7(C) is an H-H cross sectional view of the dust seal 6 as illustrated in FIG. 7(A), and FIG. 7(D) is an enlarged view of the part I of the dust seal 6 as illustrated in FIG. 7(C).

As illustrated in the figures, the dust seal 6 includes a dust seal body 60 in a substantial cylindrical shape to be attached to the annular protrusion 34 of the lower case 3, and a lip part 62 in a substantial annular shape extending from an upper end part 61 of the dust seal body 60 upwardly in the direction of the axis O and outwardly in a radial direction. The lip part 62 abuts the bottom 26 inside the annular recess section 25 of the upper case 2 with the dust seal body 60 attached to the annular protrusion 34 of the lower case 3. This causes the space formed between the upper case 2 and the lower case 3 and leading to the annular space 7 to be sealed, thereby preventing intrusion of dust into this annular space 7 (See FIG. 2).

Hereinabove, the embodiment of the present invention has been described.

According to the present embodiment, the center plate 4 is placed within the annular recess section 341 formed in the upper surface 340 of the annular protrusion 34 of the lower case 3 forming the annular space 7 along with the annular recess section 25 of the upper case 2, and has the bearing surface 40 for supporting the load applied through the load transmission surface 27 inside the annular recess section 25 of the upper case 2 and the sliding sheet 5. Moreover, the sliding sheet 5 is placed within the annular space 7 and between the bearing surface 40 of the center plate 4 and the load transmission surface 27 of the upper case 2, and has the sliding surface 51 in a slidable contact with the bearing surface 40 of the center plate 4. In addition, the upper case 2 and the lower case 3 are combined together so as to be rotatable relative to each other due to the interposition of the center plate 4 and the sliding sheet 5 between the cases 2, 3. This enables the slide bearing 1 to support the load on the suspension while allowing rotational motion of the shock absorber of the suspension to be inserted in the holding hole 10.

In the present embodiment, the hollow sections 321 are formed in the outer peripheral surface 320 of the flange part 32 of the lower case 3, therefore reducing the usage of materials to achieve weight reduction of the lower case 3, cost cutting, or the like, and therefore allowing hollow section to be omitted from the lower surface 37 of the flange part 32 to flatten the lower surface 37 of the flange part 32. This causes the reaction force of the coil spring transmitted from the coil spring to the lower case 3 directly or through a rubber sheet to be distributed over the lower surface 37 of the flange part 32 even when the lower surface 37 of the flange part 32 is designed to work as alternative to an upper spring seat without use of the upper spring seat. This leads to no possibility of damage to the lower case 3 or the rubber sheet, resulting in retention of strength of the slide bearing 1, and at the same time achieves weight reduction and cost cutting.

In the present embodiment, the wall surface 322, which is located on the lower side (in the direction of the axis O) of each hollow section 321 formed in the outer peripheral surface 320 of the flange part 32 of the lower case 3, slopes in the upward direction of the axis O as it goes radially inwardly. This enable fluid entering the hollow sections 321, such as muddy water, to be discharged to the outside, and therefore reduction of the effect of the fluid, such as muddy water, on the lower case 3 is provided, resulting in long life span of the slide bearing 1. Here, the slope α of the wall surface 322 with respect to the perpendicular P to the axis O may be designed to be larger than the slope of the axis O with respect to the vertical line when the slide bearing 1 is attached to the vehicle body, and this allows more reliable discharge of fluid entering the hollow sections 321, such as muddy water, to the outside, resulting in further extension of the life span of the slide bearing 1.

In the present embodiment, the hollow sections 343 is provided in the bottom 342 inside the annular recess section 341 formed in the upper surface 340 of the annular protrusion 34 of the lower case 3, therefore further reducing the usage of materials to achieve further weight reduction of the lower case 3, cost cutting, or the like.

In the present embodiment, the dust seal 6 is provided so as to seal the space between the upper case 2 and the lower case 3 where leads to the annular space 7, therefore preventing dust from intruding between the bearing surface 40 of the center plate 4 and the sliding surface 51 of the sliding sheet 5; and this enables sliding performances of the slide bearing 1 to be sustained over a long period.

In the present embodiment, the bearing surface 40 of the center plate 4 is provided with the annular groove 42 for holding the lubricant, such as lubricating grease, and therefore the lubricant lubricates the bearing surface 40 of the center plate 4, thereby improving sliding properties of the slide bearing 1.

The present invention can include, but is not limited to, the above embodiment: it will be obvious to those skilled in the art that various changes may be made without departing from the scope of the invention.

For example, in the above embodiment, each of the hollow section 321 formed on the outer peripheral surface 320 of the flange part 32 of the lower case 3 is the recess section in the form of a substantial quadrangular prism. The scope of the present invention, however, is not limited in this respect. Each of the hollow sections 321 may be a recess section in the form of a substantial polygonal prism other than a rectangular prism, or may be a recess section in the form of a substantial cylinder.

In the above embodiment, inside each hollow section 321, the corresponding wall surface 322 located on the lower side in the direction of the axis O slopes in the upward direction of the axis O as it goes radially inwardly. The scope of the present invention, however, is not limited in this respect. In some cases, such as when there is no need to take intrusion of fluid entering the hollow sections 321, such as muddy water, into consideration, the wall surface 322 located on the lower side, in the direction of the axis O, of each hollow section 321 may be parallel to the perpendicular P to the axis O, for example.

In the above embodiment, each of the hollow sections 343 in the bottom 342 inside the annular recess section 341 formed in the upper surface 340 of the annular protrusion 34 of the lower case 3 is the recess section in the form of a substantial cylinder. The scope of the present invention, however, is not limited in this respect. The hollow sections 343 each may be a recess section in the form of a substantial polygonal prism. In addition, the hollow sections 343 may be provided or be omitted, as necessary.

Figure 8:
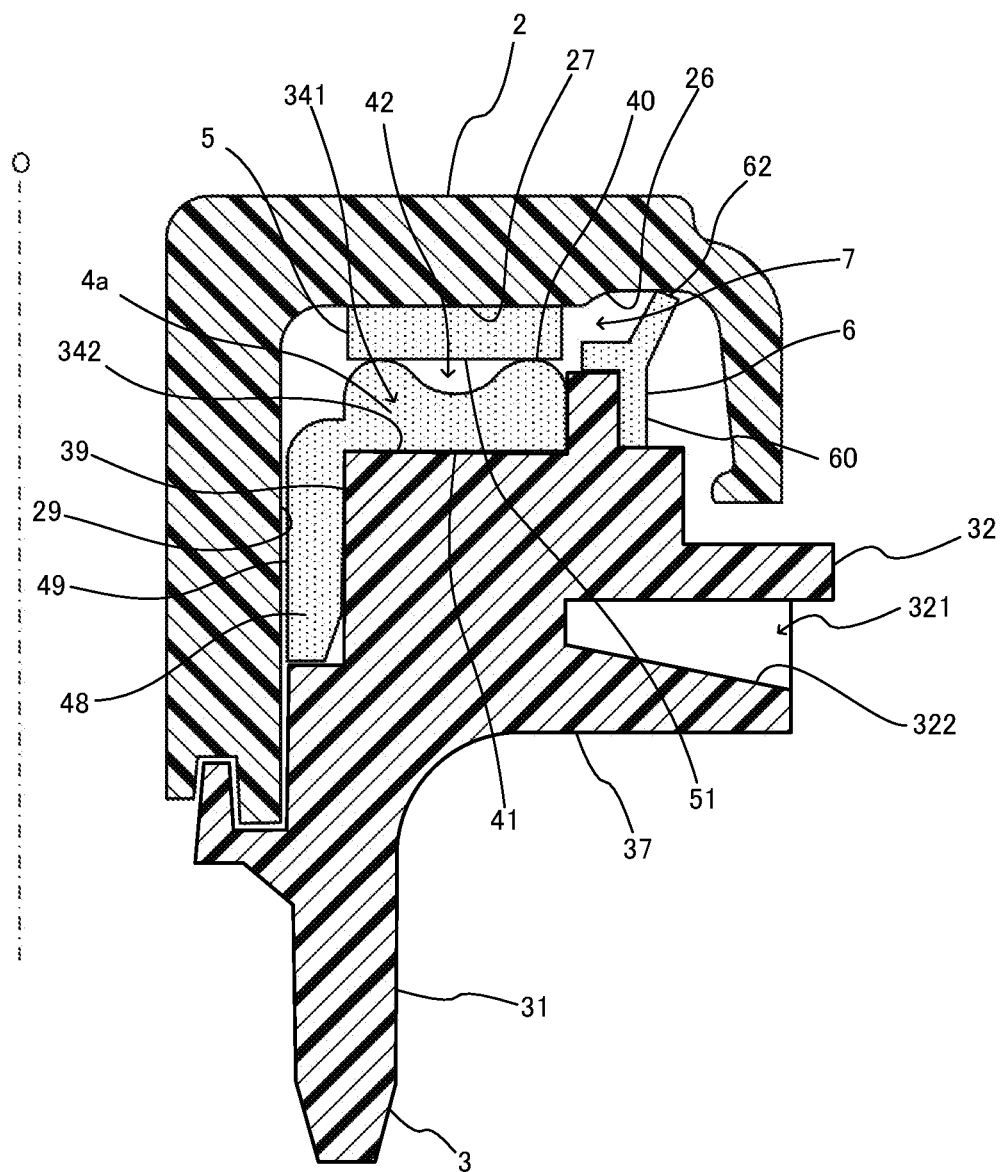
FIG. 8 is a diagram for explanation about a modification of the slide bearing 1, which is a view (an enlarged view of an equivalent of the part B in FIG. 1(D)) corresponding to FIG. 2.
Figure 9:
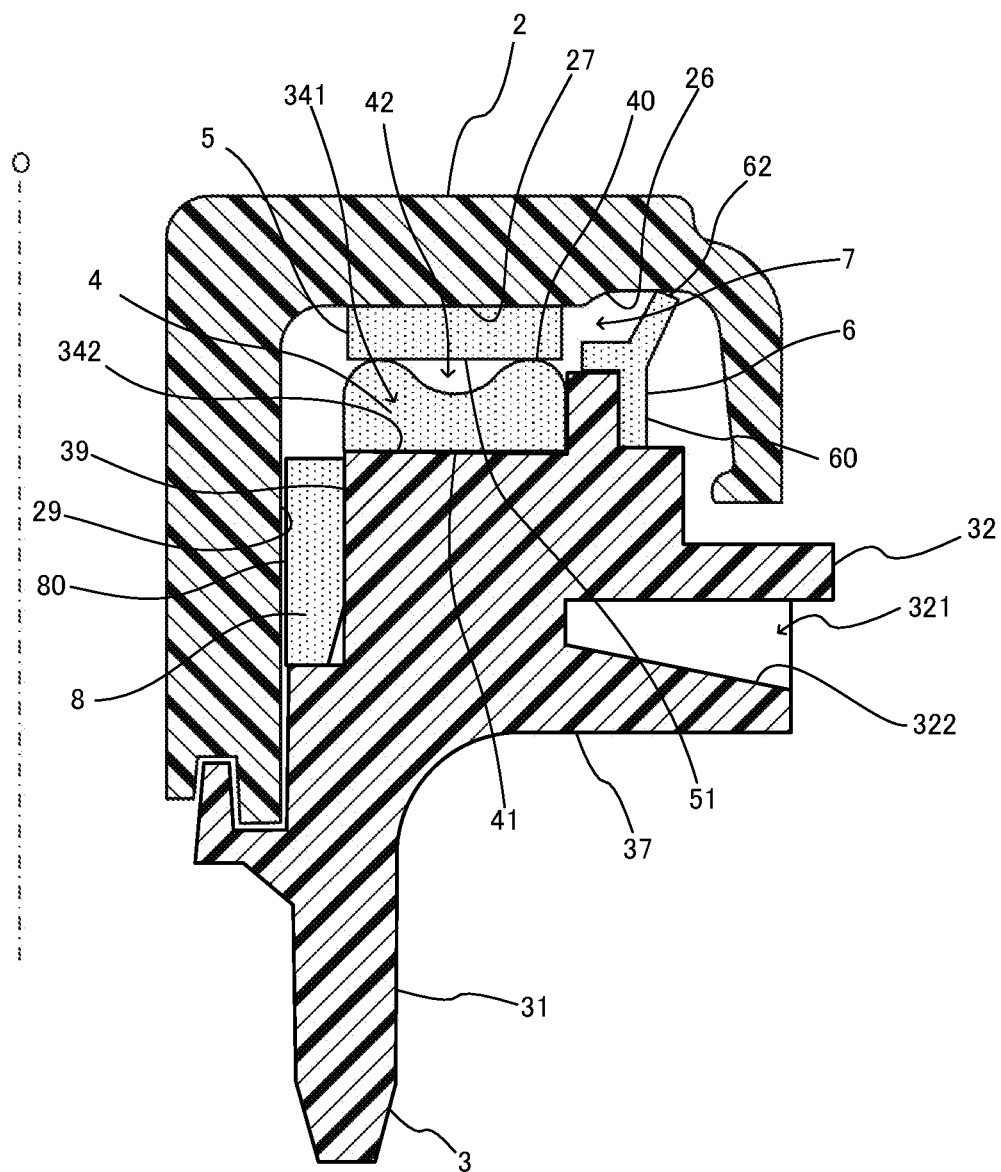
FIG. 9 is a diagram for explanation about a modification of the bearing 1, which is a view (an enlarged view of an equivalent of the part B in FIG. 1(D)) corresponding to FIG. 2.

In the above embodiment, the bearing surface 40 formed on the center plate 4 supports the load in a thrust direction (i.e. in the direction of the axis O) as illustrated in FIG. 2, but not limited thereto; as in a modification 4a of the center plate 4 as illustrated in FIG. 8, a boss 48 in a substantial cylindrical shape, an inner peripheral surface of which is provided with a bearing surface 49 for slidable contact with an inner wall 29 on the inner peripheral side of the annular recess section 25 of the upper case 2, may be formed integrally with an inner edge of the back face 41 of the center plate 4. And, this boss 48 may be located between the inner wall 29 on the inner peripheral side of the annular recess section 25 of the upper case 2 and an inner peripheral surface 39 of the lower case body 31 of the lower case 3 so that not only the bearing surface 40 can support the load in the thrust direction but also the bearing surface 49 can support a load in a radial direction (i.e. in a direction perpendicular to the axis O). Alternatively, as illustrated in FIG. 9, a bushing 8, an inner peripheral surface of which is provided with a bearing surface 80 for a slidable contact with the inner wall 29 on the inner peripheral side of the annular recess section 25 of the upper case 2, may be placed between the inner wall 29 on the inner peripheral side of the annular recess section 25 of the upper case 2 and the inner peripheral surface 39 of the lower case body 31 of the lower case 3 so that not only the center plate 4 can support the load in the thrust direction but also the bushing 8 can support the load in the radial direction.

In the above embodiment, as illustrated in FIG. 2, the center plate 4 is located on the lower case 3 side of the annular space 7 with the bearing surface 40 faced upwardly in the direction of the axis O, and the sliding sheet 5 is located on the upper case 2 side of the annular space 7 with the sliding surface 51 faced downwardly in the direction of the axis O. The scope of the present invention, however, is not limited in this respect. The center plate 4 may be located on the upper case 2 side of the annular space 7 with the bearing surface 40 faced downwardly in the direction of the axis O, and the sliding sheet 5 may be located on the lower case 3 side of the annular space 7 with the sliding surface 51 faced upwardly in the direction of the axis O.

Figure 10:
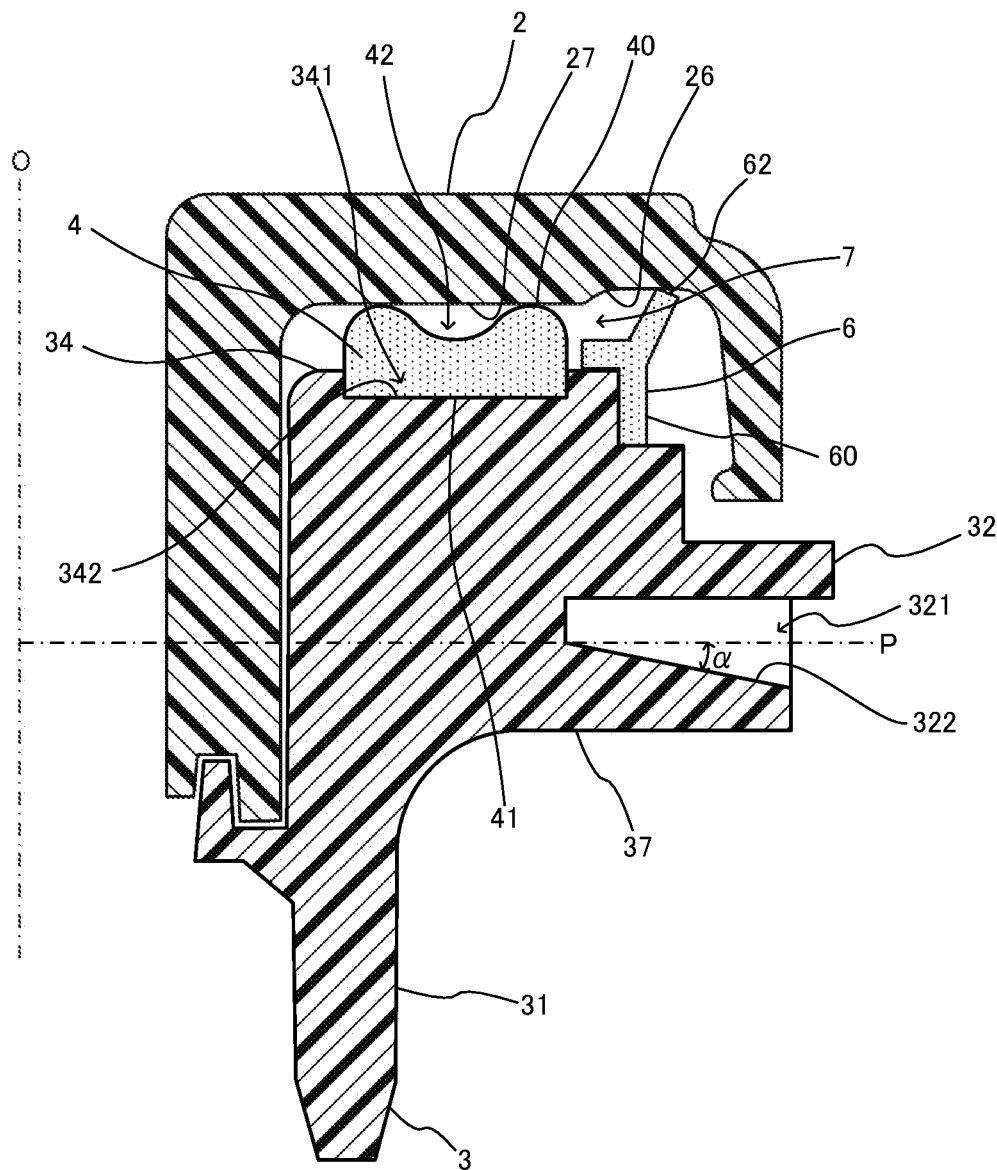
FIG. 10 is a diagram for explanation about a modification of the bearing 1, which is a view (an enlarged view of an equivalent of the part B in FIG. 1(D)) corresponding to FIG. 2.
Figure 11:
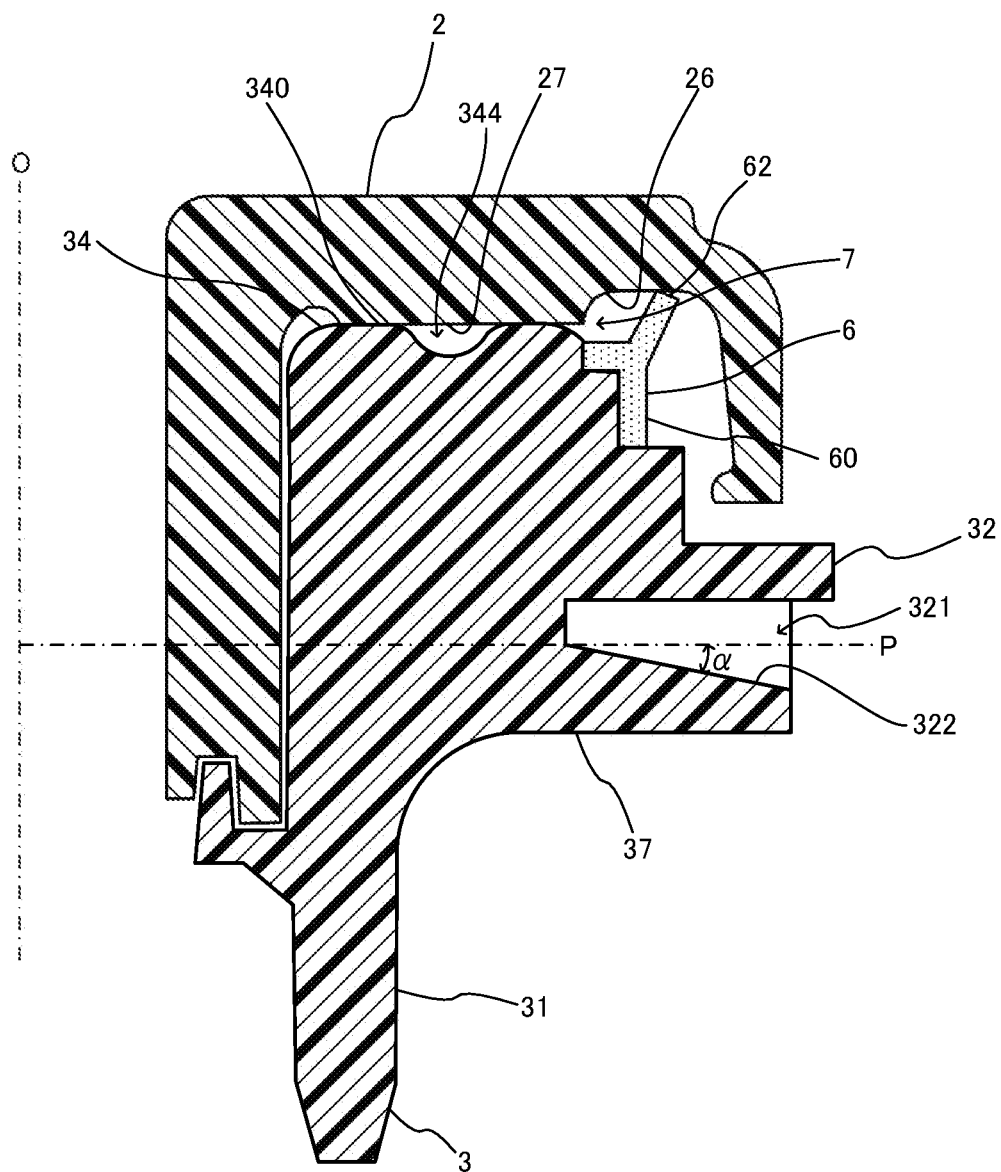
FIG. 11 is a diagram for explanation about a modification of an equivalent of the bearing 1, which is a view (an enlarged view of the part B in FIG. 1(D)) corresponding to FIG. 2.

In the above embodiments, as illustrated in FIG. 2, the center plate 4 and the sliding sheet 5 are located within the annular space 7. The scope of the present invention, however, is not limited in this respect. For example, as illustrated in FIG. 10, the sliding sheet 5 may be omitted, so that the bearing surface 40 of the center plate 4 may slide directly with the load transmission surface 27 formed on the bottom 26 inside the annular recess section 25 of the upper case 2. Alternatively, as illustrated in FIG. 11, it may be that the center plate 4 and the sliding sheet 5 are omitted and the annular recess section 341 formed on the upper surface 340 of the annular protrusion 34 of the lower case 3 is omitted, so that the bottom 26 inside the annular recess section 25 of the upper case 2 may be slide directly with the upper surface 340 of the annular protrusion 34 of the lower case 3. In such a case, it may be preferable that the upper surface 340 of the annular protrusion 34 of the lower case 3 is provided with a holding part 344 for holding lubricant, such as lubricating grease. The holding part 344 may be an annular groove, or, may be a plurality of recess sections arranged in the circumferential direction.

The present invention is widely applicable to slide bearing for supporting a load, in various mechanisms, including the suspension of the vehicle.

REFERENCE SIGNS LIST

1: slide bearing, 2: upper case, 3: lower case, 4, 4a: center plate, 5: sliding sheet, 6: dust seal, 7: annular space, 10: holding hole of the slide bearing 1, 20: insertion hole of the upper case 2, 21: upper case body, 22: upper surface of the upper case body 21, 23: attachment surface of the upper case body 21, 24: lower surface of the upper case body 21, 25: annular recess section of the upper case body 21, 26: bottom inside the annular recess section 25, 27: load transmission surface of the upper case 2, 29: inner wall on the inner peripheral side of the annular recess section 25, 30: insertion hole of the lower case 3, 31: lower case body, 32: flange part of the lower case 3, 33: upper surface of the flange part 32, 34: annular protrusion of the lower case 3, 35: upper end part of the lower case body 31, 36: outer peripheral surface of the lower case body 31, 37: lower surface of the flange part 32, 39: inner peripheral surface of the lower case body 31, 40: bearing surface of the center plate 4, 41: back face of the center plate 4, 42: annular groove in the bearing surface 40, 48: boss, 49: bearing surface of the boss 48, 60: dust seal body of the dust seal 6, 61: upper end part of the dust seal body 60, 62: lip part of the dust seal 6, 8: bushing, 80: bearing surface of the bushing 8, 320: outer peripheral surface of the flange part 32, 321: hollow section, 322: wall surface of the hollow section 321, 340: upper surface of the annular protrusion 34, 341: annular recess section of the lower case 3, 342: bottom inside the annular recess section 341, 343: hollow section

The invention claimed is:

1. A slide bearing for supporting a load, comprising:
an upper case; and
a lower case rotatably combined with the upper case, the lower case comprising:
a lower case body in a substantial cylindrical shape;
a flange part projecting radially outwardly from an outer peripheral surface of the lower case body; and
a recess section formed on an outer peripheral surface of the flange part,
wherein a lower side of an interior of the recess section has a wall surface that slopes upwardly in a radial direction toward a central axis of the lower case body,
wherein the wall surface slopes upwardly at a first angle relative to a line that is perpendicular to the central axis of the lower case body,
wherein the slide bearing is configured so that when the slide bearing is attached to an object to be supported, the central axis of the lower case body is oriented at a second angle relative to a vertical line, and
wherein the first angle is larger than the second angle.

2. A slide bearing according to claim 1, comprising a plurality of the recess sections formed at equal intervals in a circumferential direction of the outer peripheral surface of the flange part.

3. A slide bearing according to claim 2, further comprising an annular center plate located between the upper case and the lower case and configured to provide for a relative rotational motion between the upper case and the lower case.

4. A slide bearing according to claim 3, further comprising an annular sliding sheet located between the annular center plate and one of the upper case or the lower case.

5. A slide bearing according to claim 2, further comprising a sealing member configured to seal a space between the upper case and the lower case from an outside.

6. A slide bearing according to claim 1, further comprising an annular center plate located between the upper case and the lower case and configured to provide for a relative rotational motion between the upper case and the lower case.

7. A slide bearing according to claim 6, further comprising an annular sliding sheet located between the annular center plate and one of the upper case or the lower case.

8. A slide bearing according to claim 7, further comprising a sealing member configured to seal a space between the upper case and the lower case from an outside.

9. A slide bearing according to claim 7, wherein
the slide bearing is configured to support a load on a shaft member while allowing the shaft member to rotate,
the upper case is configured to be attached to an object to be supported by the shaft member with the shaft member inserted in the upper case,
the lower case is combined with the upper case so as to be rotatable relative to the upper case with the shaft member inserted in the lower case, and
the annular center plate and the annular sliding sheet are configured to be located between the upper case and the lower case, with the shaft member inserted in the annular center plate and the annular sliding sheet.

10. A slide bearing according to claim 6, further comprising a sealing member configured to seal a space between the upper case and the lower case from an outside.

11. A slide bearing according to claim 1, further comprising a sealing member configured to seal a space between the upper case and the lower case from an outside.

* * * * *